United States Patent
Han et al.

(10) Patent No.: US 11,788,619 B2
(45) Date of Patent: Oct. 17, 2023

(54) METHOD AND DEVICE FOR CONTROLLING A TRANSMISSION OF A VEHICLE

(71) Applicants: HYUNDAI MOTOR COMPANY, Seoul (KR); KIA CORPORATION, Seoul (KR)

(72) Inventors: Hoon Han, Hwaseong-si (KR); Gwangil Du, Ansan-si (KR); Kyeongkeun Kim, Hwaseong-si (KR); Mingyun Jo, Seoul (KR); Jae Young Choi, Seoul (KR); Hannah Song, Daejeon (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 0 days.

(21) Appl. No.: 17/951,901

(22) Filed: Sep. 23, 2022

(65) Prior Publication Data
US 2023/0184325 A1  Jun. 15, 2023

(30) Foreign Application Priority Data
Dec. 9, 2021 (KR) .................. 10-2021-0176002

(51) Int. Cl.
*F16H 59/18* (2006.01)
*F16H 61/02* (2006.01)
(Continued)

(52) U.S. Cl.
CPC ......... *F16H 61/0213* (2013.01); *F16H 59/18* (2013.01); *F16H 59/54* (2013.01);
(Continued)

(58) Field of Classification Search
CPC .. F16H 59/18; F16H 59/54; F16H 2059/6807; F16H 59/22; F16H 61/0213;
(Continued)

(56) References Cited

U.S. PATENT DOCUMENTS 5,203,235 A * 4/1993 Iizuka ..................... F16H 61/21
477/118
5,441,464 A * 8/1995 Markyvech .......... B60W 10/111
477/109
(Continued)

FOREIGN PATENT DOCUMENTS

JP  2013126812 A  6/2013
JP  2014119072 A * 6/2014

*Primary Examiner* — Roger L Pang
(74) *Attorney, Agent, or Firm* — LEMPIA SUMMERFIELD KATZ LLC

(57) ABSTRACT

A method for controlling a transmission of a vehicle includes: determining whether a controller receives an acceleration pedal off signal corresponding to a lift foot up (LFU) shift request signal from an acceleration pedal sensor; determining whether an output signal value of a brake pedal sensor detecting a position value of a brake pedal is less than a brake reference value when the acceleration pedal off signal is received; determining whether a gear shifting progressing rate of the transmission performing a LFU shift in response to the LFU shift request signal is less than a progressing rate reference value when an output signal value of the brake pedal sensor is equal to or greater than the brake reference value; and controlling the transmission to hold the LFU shift when the gear shifting progressing rate of the transmission is less than the progressing rate reference value.

12 Claims, 2 Drawing Sheets

(51) Int. Cl.
 *F16H 59/54* (2006.01)
 *F16H 61/16* (2006.01)
 *F16H 61/08* (2006.01)
 *F16H 59/68* (2006.01)
 *F16H 59/22* (2006.01)

(52) U.S. Cl.
 CPC ............ *F16H 61/16* (2013.01); *F16H 59/22* (2013.01); *F16H 61/08* (2013.01); *F16H 2059/6807* (2013.01); *F16H 2061/161* (2013.01); *F16H 2061/163* (2013.01)

(58) Field of Classification Search
 CPC .... F16H 61/16; F16H 61/08; F16H 2061/161; F16H 2061/163
 USPC ..................................................... 701/58, 60
 See application file for complete search history.

(56) References Cited

U.S. PATENT DOCUMENTS 10,267,412 B2 4/2019 Kuang et al.
2021/0123525 A1* 4/2021 Okubo .................... F16H 61/16

* cited by examiner

METHOD AND DEVICE FOR CONTROLLING A TRANSMISSION OF A VEHICLE

CROSS-REFERENCE TO RELATED APPLICATION

This application claims priority to and the benefit of Korean Patent Application No. 10-2021-0176002 filed in the Korean Intellectual Property Office on Dec. 9, 2021, the entire contents of which are incorporated herein by reference.

BACKGROUND OF THE DISCLOSURE

(a) Field of the Disclosure

The present disclosure relates to a vehicle. More particularly, the present disclosure relates to a method and device for controlling a transmission of a vehicle.

(b) Description of the Related Art

In general, in an automatic transmission applied to a vehicle, a shift control device controls a plurality of solenoid valves to control a hydraulic pressure depending on a driving speed of the vehicle, an opening rate of a throttle valve, and many other conditions, so that a shift gear of a target gear stage is operated to automatically perform a shift.

In other words, when a driver of a vehicle operates a shift lever to change a range (i.e., gear shift), as a port of a manual valve changes, a hydraulic pressure supplied from an oil pump is selectively operated by various operating elements of a shift gear mechanism according to a duty control of the solenoid valve to perform a shift.

In the automatic transmission operated in this way, when the shift to the target gear stage is performed, the shift is performed by an interaction of a friction element that is released from an operating state and the friction element that is switched from the released state to the operating state. The shift performance of the automatic transmission is greatly affected by the timing of the operation and the release of these friction elements. Accordingly, various methods for controlling a transmission have been developed to enable a flexible shift of the automatic transmission.

As one of these methods for controlling a transmission in an automatic transmission vehicle, when a driver takes his/her foot off an acceleration pedal to decelerate while driving a vehicle, a lift foot up (LFU) shift is performed to prevent shocks to a vehicle body due to a fluctuation in a vehicle speed caused by a sharp reduction in an engine speed while performing a shift from the driving gear stage to a higher gear stage.

The above information disclosed in this Background section is only for enhancement of understanding of the background of the disclosure, and therefore it may contain information that does not form the prior art that is already known in this country to a person of ordinary skill in the art.

SUMMARY OF THE DISCLOSURE

The present disclosure has been made in an effort to provide a method and device for controlling a transmission of a vehicle capable of prohibiting a lift foot up (LFU) shift operation when braking occurs during the LFU shift (or the LFU upshift) of a vehicle.

An embodiment of the present disclosure provides a method for controlling a transmission of a vehicle, the method including: determining, by a controller, whether the controller receives an acceleration pedal off signal corresponding to a lift foot up (LFU) shift request signal from an acceleration pedal sensor; determining, by the controller, whether an output signal value of a brake pedal sensor detecting a position value of a brake pedal is less than a brake reference value when the acceleration pedal off signal is received; determining, by the controller, whether a gear shifting progressing rate of the transmission performing a LFU shift in response to the LFU shift request signal is less than a progressing rate reference value when the output signal value of the brake pedal sensor is equal to or greater than the brake reference value; and controlling, by the controller, the transmission to hold the LFU shift when the gear shifting progressing rate of the transmission is less than the progressing rate reference value.

The method may further include controlling, by the controller, the transmission to perform the LFU shift when the gear shifting progressing rate of the transmission is equal to or greater than the progressing rate reference value.

The method may further include determining, by the controller, whether a state of the transmission is a state in which the LFU shift is held when the output signal value of the brake pedal sensor is less than the brake reference value, in which, when the state of the transmission is not the state in which the LFU shift is held, the controller may control the transmission to perform the LFU shift.

The method may further include determining whether an LFU shift holding time exceeds a time reference value that is a specific time elapsed after the output signal of the brake pedal sensor is converted into a signal indicating an off state of the brake pedal when the state of the transmission is the state where the LFU shift is held, in which, when the LFU shift holding time is equal to or less than the time reference value, the controller may control the transmission to maintain the state where the LFU shift is held.

When the LFU shift holding time exceeds the time reference value, the controller may control the transmission to perform the LFU shift.

The LFU shift may include a shift operation in which a gear stage of the transmission is shifted from a second gear to a third gear.

Another embodiment of the present disclosure provides a device for controlling a transmission of a vehicle, the device including: an acceleration pedal sensor outputting an acceleration pedal off signal corresponding to a lift foot up (LFU) shift request signal; and a controller determining whether the acceleration pedal off signal is received from the acceleration pedal sensor, in which the controller may determine whether an output signal value of a brake pedal sensor detecting a position value of a brake pedal is less than a brake reference value when the acceleration pedal off signal is received. The controller may determine whether a clear shifting progressing rate of the transmission performing a LFU shift in response to the LFU shift request signal is less than a progressing rate reference value when an output signal value of the brake pedal sensor is equal to or greater than the brake reference value. The controller may control the transmission to hold the LFU shift when the gear shifting progressing rate of the transmission is less than the progressing rate reference value.

The controller may control the transmission to perform the LFU shift when the gear shifting progressing rate of the transmission is equal to or greater than the progressing rate reference value.

The controller may determine whether a state of the transmission is a state in which the LFU shift is held when the output signal value of the brake pedal sensor is less than the brake reference value. When the state of the transmission is not the state in which the LFU shift is held, the controller may control the transmission to perform the LFU shift.

The controller may determine whether the LFU shift holding time exceeds a time reference value that is a specific time elapsed after the output signal of the brake pedal sensor is converted into a signal indicating an off state of the brake pedal when the state of the transmission is the state where the LFU shift is held. When the LFU shift holding time is equal to or less than the time reference value, the controller may control the transmission to maintain the state where the LFU shift is held.

When the LFU shift holding time exceeds the time reference value, the controller may control the transmission to perform the LFU shift.

The LFU shift may include a shift operation in which a gear stage of the transmission is shifted from a second gear to a third gear.

According to an embodiment of the present disclosure, a method and device for controlling a transmission of a vehicle may prohibit a lift foot up (LFU) shift operation when braking occurs during a LFU shift of the vehicle. Therefore, the unnecessary upshift due to the LFU operation may be prevented to reduce the number of times of shifts and prevent a busy shift phenomenon, thereby improving drivability of a vehicle. Furthermore, the energy loss of regenerative braking of the vehicle generated when braking during the LFU shift is reduced to improve fuel efficiency of the vehicle.

BRIEF DESCRIPTION OF THE DRAWINGS

A brief description of the drawings are provided in order to allow the drawings used in a detailed description of the present disclosure to be sufficiently understood.

DETAILED DESCRIPTION

Figure 1:
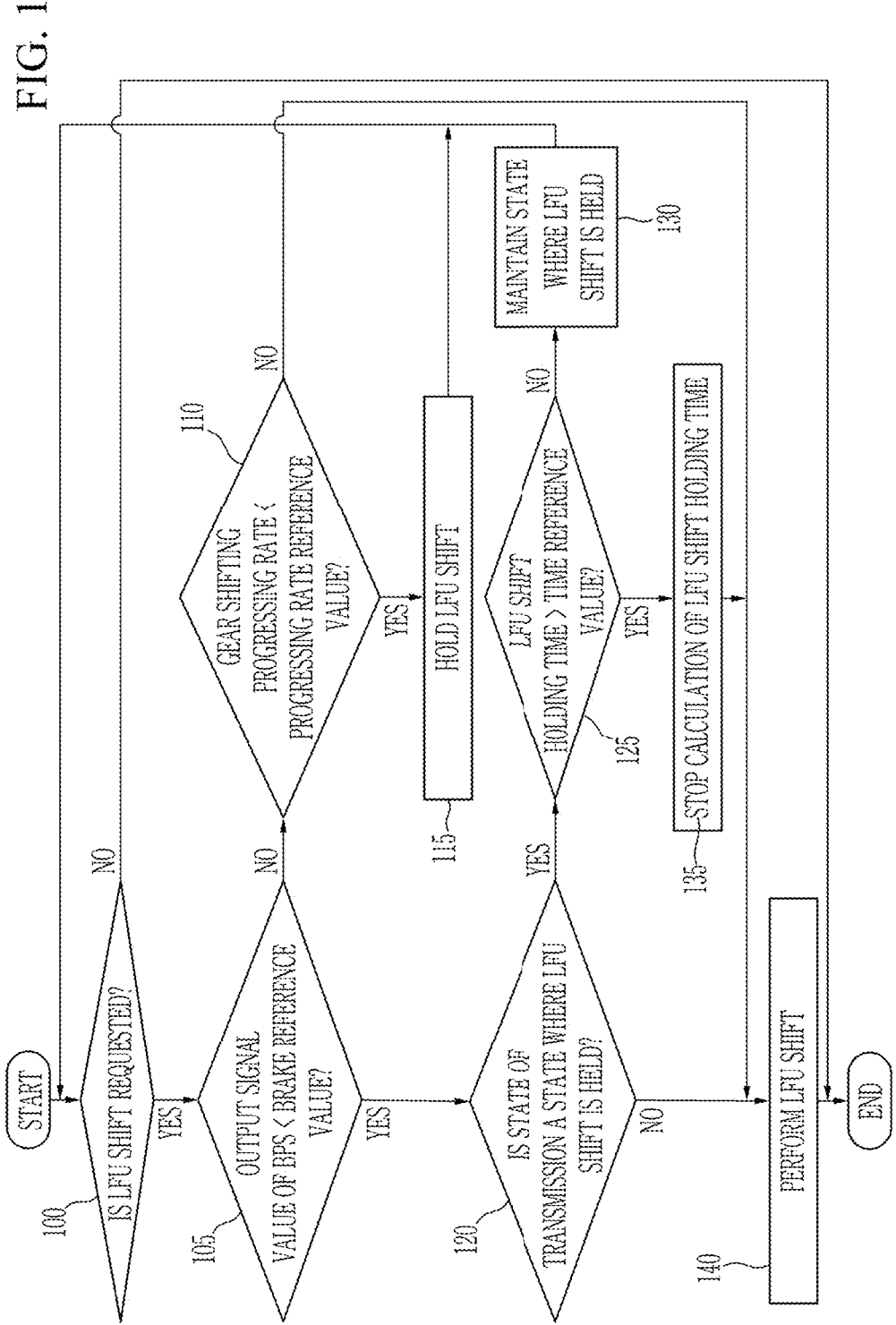
FIG. 1 is a flowchart for describing a method for controlling a transmission of a vehicle according to an embodiment of the present disclosure.

In order to sufficiently understand the present disclosure and objects accomplished by executing the present disclosure, reference should be made to the accompanying drawings illustrating embodiments of the present disclosure and contents described in the accompanying drawings.

Hereinafter, the present disclosure is described in detail by describing embodiments of the present disclosure with reference to the accompanying drawings. In describing the present disclosure, well-known configurations or functions will not be described in detail since they may unnecessarily obscure the gist of the present disclosure. Throughout the drawings, the same reference numerals will denote the same components.

Terms used in the present specification are used only in order to describe specific embodiments rather than limiting the present disclosure. Singular forms are to include plural forms unless the context clearly indicates otherwise. It should be further understood that the terms "include" or "have" used in the present specification specify the presence of features, numerals, steps, operations, components, or parts mentioned in the present specification, or a combination thereof, but do not preclude the presence or addition of one or more other features, numerals, steps, operations, components, parts, or a combination thereof.

Throughout the present specification, when any one portion is referred to as being "connected to" another portion, it means that any one portion and another portion are "directly connected to" each other or are electrically or mechanically connected to each other with the other component interposed therebetween.

Unless being defined otherwise, the terms used in the present specification, including technical and scientific terms, have the same meanings as those that are generally understood by a person of ordinary skill in the art. It should be understood that the terms defined by the dictionary are identical with the meanings within the context of the related art, and they should not be ideally or excessively formally defined unless the context clearly dictates otherwise.

When a component, device, element, or the like of the present disclosure is described as having a purpose or performing an operation, function, or the like, the component, device, or element should be considered herein as being "configured to" meet that purpose or to perform that operation or function.

According to the related art, when braking of a vehicle occurs after an acceleration pedal of the vehicle is turned off, upshift of a transmission due to an off state of the acceleration pedal is performed and downshift due to a deceleration of the vehicle is performed, which may result in a busy shift phenomenon. For example, the busy shift phenomenon may be a phenomenon in which a gear stage of the transmission is continuously shifted from a second gear to a third gear and then shifted from the third gear to the second gear.

Figure 2:
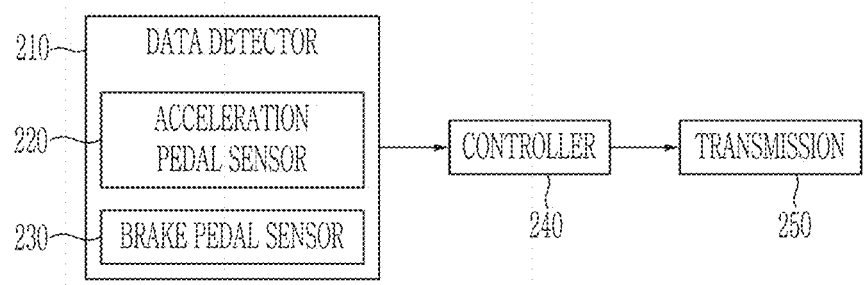
FIG. 2 is a block diagram for describing a device for controlling a transmission of a vehicle to which the method for controlling a transmission of a vehicle illustrated in FIG. 1 is applied.

FIG. 1 is a flowchart for describing a method for controlling a transmission of a vehicle according to an embodiment of the present disclosure. FIG. 2 is a block diagram for describing a device for controlling a transmission of a vehicle to which the method for controlling a transmission of a vehicle illustrated in FIG. 1 is applied.

Referring to FIGS. 1 and 2, in a determination step 100, a controller 240 may determine whether the controller 240 receives an acceleration pedal off signal corresponding to a lift foot up (LFU) shift request signal from an acceleration pedal sensor 220 included in a data detector 210. The LFU shift refers to a shift method of allowing a shift to be performed from a gear stage of the transmission 250 while driving to one higher gear stage when a driver of the vehicle takes his/her foot off an acceleration pedal in order to decelerate while driving the vehicle to prevent the occurrence phenomenon of a shock to a vehicle body due to a change in vehicle speed due to a sudden drop in an engine speed of the vehicle. For example, the LFU shift may include a shift operation in which a gear stage of the transmission 250 is shifted from a second gear to a third gear.

As illustrated in FIG. 2, the vehicle includes a data detector 210 that includes an acceleration pedal sensor (APS) 220 detecting an on state or an off state of an acceleration pedal of the vehicle. The data detector 210 also includes a brake pedal sensor (BPS) 230 detecting an on state or an off state of a brake pedal, a controller 240, and a transmission 250. The device for controlling a transmission 250 of a vehicle may include the data detector 210 and the controller 240.

The acceleration pedal sensor (APS) 220 may measure (detect) a position value of the acceleration pedal (i.e., a degree to which the acceleration pedal is pressed). When the acceleration pedal is fully pressed, the position value of the acceleration pedal may be 100%. When the acceleration pedal is not depressed, the position value of the acceleration pedal may be 0%. The brake pedal sensor (BPS) 230 may measure (detect) the position value of the brake pedal (i.e., the degree to which the brake pedal is pressed). When the brake pedal is fully pressed, the position value of the acceleration pedal may be 100%. When the brake pedal is not pressed, the position value of the brake pedal may be 0%.

The controller 240, which may be an electronic control unit (ECU), may control an entire operation of the vehicle. The controller 240 may be, for example, one or more microprocessors operated by a program (e.g., control logic) or hardware (e.g., a microcomputer) including the microprocessors, and the program may include a series of instructions for performing the method of controlling a transmission 250 of a vehicle according to an embodiment of the present disclosure. The instructions may be stored in a memory of the controller 240.

The transmission 250 may transmit an output of a driving source (or power source), such as an engine including an automatic transmission for driving a vehicle, for example.

When the acceleration pedal off signal is not received, the method for controlling a transmission 250 of a vehicle ends. When the acceleration pedal off signal is received, the method for controlling a transmission 250 of a vehicle may proceed to step 105.

According to step 105 illustrated in FIG. 1 the controller 240 may determine whether an output signal value of a brake pedal sensor (BPS) 230 is less than a brake reference value. The output signal of the brake pedal sensor 230 may be activated in an on state for a specific time. The step 105 may be a step of determining a braking intention of a driver of a vehicle. The break reference value may be determined by a test (or experiment) and stored in the memory.

When the output signal value of the brake pedal sensor 230 is equal to or greater than a brake reference value, the method for controlling a transmission 250 of a vehicle proceeds to step 110. When the output signal value of the brake pedal sensor 230 is less than the brake reference value, the method for controlling a transmission 250 of a vehicle may proceed to step 120.

According to step 110, the controller 240 may determine whether a gear shifting progressing rate of the transmission 250 for performing the LFU shift in response to the LFU shift request signal is less than a progressing rate reference value. The progressing rate reference value may be determined by a test (or experiment) and stored in the memory.

The controller 240 may calculate the gear shifting progressing rate of the transmission 250 by using a revolutions per minute (RPM) of an input shaft of the transmission 250, an RPM at a target gear stage of the transmission 250, and an RPM at a current gear stage of the transmission 250. For example, the controller 240 may calculate the gear shifting progressing rate of the transmission 250 using the following Equation.

Gear shifting progressing rate of transmission 250=1−(RPM at target gear stage of transmission 250−RPM of input shaft of transmission 250)/(RPM at target gear stage of transmission 250−RPM at current gear stage of transmission 250)

When the gear shifting progressing rate of the transmission 250 is less than the progressing rate reference value, the method for controlling a transmission 250 of a vehicle proceeds to step 115. When the gear shifting progressing rate of the transmission 250 is equal to or greater than the progressing rate reference value, the method for controlling a transmission 250 of a vehicle may proceed to step 140.

According to step 115, the controller 240 may control the transmission 250 so that the transmission 250 holds (or stops) the LFU shift. The controller 240 may start calculating the LFU shift holding time using a timer. After step 115, the method for controlling a transmission 250 of a vehicle may proceed to step 100.

According to step 140, the controller 240 may control the transmission 250 so that the transmission 250 performs (progresses) the LFU shift.

According to step 120, the controller 240 may determine (check) whether the state of the transmission 250 is the LFU shift holding state (or whether the state of the transmission 250 enters the LFU shift holding state).

When the state of the transmission 250 is the LFU shift holding state, the method for controlling a transmission 250 of a vehicle proceeds to step 125. When the state of the transmission 250 is not the LFU shift holding state, the method for controlling a transmission 250 of a vehicle may proceed to step 140.

According to step 125, the controller 240 may determine whether the LFU shift holding time exceeds a time reference value. The time reference value may be a specific time elapsed after the output signal of the brake pedal sensor 230 is converted into a signal indicating an off state of the brake pedal, and may be stored in the memory. The specific time may be determined by a test (or experiment).

When the LFU shift holding time is equal to or less than the time reference value, the method for controlling a transmission 250 of a vehicle proceeds to step 130. When the LFU shift holding time exceeds the time reference value, the method for controlling a transmission 250 of a vehicle may proceed to step 135.

According to step 130, the controller 240 may control the transmission 250 so that the transmission 250 maintains the LFU shift holding state. After step 130, the method for controlling a transmission 250 of a vehicle may proceed to step 100.

According to step 135, the controller 240 may stop the calculation of the LFU shift holding time. After step 135, the method for controlling a transmission 250 of a vehicle may proceed to step 140.

Components, "~units", blocks, or modules used in an embodiment of the present disclosure may be implemented by software such as tasks, classes, sub-routines, processes, objects, execution threads, or programs performed in a predetermined region on a memory or hardware such as a field-programmable gate array (FPGA) or an application-specific integrated circuit (ASIC) and may be implemented by a combination of the software and the hardware. The components, the "~units", or the like, may be included in a computer readable storage medium or may be partially dispersed and distributed in a plurality of computers.

Hereinabove, embodiments have been disclosed in the drawings and the specification. Specific terms have been used in the present specification, but these specific terms are used only in order to describe the present disclosure and are not used in order to limit the meaning or limit the scope of the present disclosure as disclosed in the claims. Therefore, a person of ordinary skill in the art should understand that various modifications and equivalent embodiments are possible from the present disclosure. Therefore, an actual technical protection scope of the present disclosure is to be defined by the technical spirit of the claims.

DESCRIPTION OF SYMBOLS

210: Data detector
220: Acceleration pedal sensor
230: Brake pedal sensor
240: Controller
250: Transmission

What is claimed is:

1. A method for controlling a transmission, the method comprising:
    determining, by a controller, whether the controller receives an acceleration pedal off signal corresponding to a lift foot up (LFU) shift request signal from an acceleration pedal sensor;
    determining, by the controller, whether an output signal value of a brake pedal sensor detecting a position value of a brake pedal is less than a brake reference value when the acceleration pedal off signal is received;
    determining, by the controller, whether a gear shifting progressing rate of the transmission performing a LFU shift in response to the LFU shift request signal is less than a progressing rate reference value when the output signal value of the brake pedal sensor is equal to or greater than the brake reference value; and
    controlling, by the controller, the transmission to hold the LFU shift when the gear shifting progressing rate of the transmission is less than the progressing rate reference value.

2. The method of claim 1, further comprising:
    controlling, by the controller, the transmission to perform the LFU shift when the gear shifting progressing rate of the transmission is equal to or greater than the progressing rate reference value.

3. The method of claim 1, further comprising:
    determining, by the controller, whether a state of the transmission is a state in which the LFU shift is held when the output signal value of the brake pedal sensor is less than the brake reference value,
    wherein, when the state of the transmission is not the state in which the LFU shift is held, the controller controls the transmission to perform the LFU shift.

4. The method of claim 3, further comprising:
    determining, by the controller, whether an LFU shift holding time exceeds a time reference value that is a specific time elapsed after the output signal of the brake pedal sensor is converted into a signal indicating an off state of the brake pedal when the state of the transmission is the state where the LFU shift is held,
    wherein, when the LFU shift holding time is equal to or less than the time reference value, the controller controls the transmission to maintain the state where the LFU shift is held.

5. The method of claim 4, wherein:
    when the LFU shift holding time exceeds the time reference value, the controller controls the transmission to perform the LFU shift.

6. The method of claim 1, wherein:
    the LFU shift includes a shift operation in which a gear stage of the transmission is shifted from a second gear to a third gear.

7. A device for controlling a transmission of a vehicle, the device comprising:
    an acceleration pedal sensor outputting an acceleration pedal off signal corresponding to a lift foot up (LFU) shift request signal; and
    a controller determining whether the acceleration pedal off signal is received from the acceleration pedal sensor,
    wherein the controller determines whether an output signal value of a brake pedal sensor detecting a position value of a brake pedal is less than a brake reference value when the acceleration pedal off signal is received,
    wherein the controller determines whether a gear shifting progressing rate of the transmission performing a LFU shift in response to the LFU shift request signal is less than a progressing rate reference value when the output signal value of the brake pedal sensor is equal to or greater than the brake reference value, and
    wherein the controller controls the transmission to hold the LFU shift when the gear shifting progressing rate of the transmission is less than the progressing rate reference value.

8. The device of claim 7, wherein:
    the controller controls the transmission to perform the LFU shift when the gear shifting progressing rate of the transmission is equal to or greater than the progressing rate reference value.

9. The device of claim 7, wherein:
    the controller determines whether a state of the transmission is a state in which the LFU shift is held when the output signal value of the brake pedal sensor is less than the brake reference value, and
    when the state of the transmission is not the state in which the LFU shift is held, the controller controls the transmission to perform the LFU shift.

10. The device of claim 9, wherein:
    the controller determines whether an LFU shift holding time exceeds a time reference value that is a specific time elapsed after the output signal of the brake pedal sensor is converted into a signal indicating an off state of the brake pedal when the state of the transmission is the state where the LFU shift is held, and
    when the LFU shift holding time is equal to or less than the time reference value, the controller controls the transmission to maintain the state where the LFU shift is held.

11. The device of claim 10, wherein:
    when the LFU shift holding time exceeds the time reference value, the controller controls the transmission to perform the LFU shift.

12. The device of claim 7, wherein:
    the LFU shift includes a shift operation in which a gear stage of the transmission is shifted from a second gear to a third gear.

* * * * *